(12) United States Patent
Finkelstein et al.

(10) Patent No.: US 7,463,993 B2
(45) Date of Patent: Dec. 9, 2008

(54) ADAPTIVE THERMAL-BASED FREQUENCY-BOUNDS CONTROL

(75) Inventors: Lev Finkelstein, Netanya (IL); Efraim Rotem, Haifa (IL); Oren Lamdan, Kiryat Tivon (IL); Aviad Cohen, Bat-Chen (IL)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 11/125,769

(22) Filed: May 10, 2005

(65) Prior Publication Data

US 2006/0254296 A1 Nov. 16, 2006

(51) Int. Cl.
*G01K 1/00* (2006.01)
*G06K 15/00* (2006.01)
*G06F 1/00* (2006.01)
*G05D 23/00* (2006.01)

(52) U.S. Cl. ............. 702/132; 702/130; 700/299; 713/300; 62/259.2

(58) Field of Classification Search ........... 62/259.2, 62/157; 702/130, 131, 136, 132; 700/153, 700/299; 710/36; 711/100; 713/300
See application file for complete search history.

(56) References Cited

U.S. PATENT DOCUMENTS 5,825,674 A 10/1998 Jackson
2002/0143488 A1* 10/2002 Cooper et al. ............... 702/132

FOREIGN PATENT DOCUMENTS

WO  WO 2004/036398 A2   4/2004
WO  WO-2004036398 A2 *  4/2004

OTHER PUBLICATIONS

PCT International Search Report, International Application No. PCT/US2006/016671, International filing date Apr. 28, 2006, mailing date May 7, 2007.

* cited by examiner

*Primary Examiner*—Chen-Wen Jiang
(74) *Attorney, Agent, or Firm*—Blakely, Sokoloff, Taylor & Zafman LLP (57) ABSTRACT

Systems and methods of thermal management provide for dynamically the upper and lower operating points of a throttled device such as a processor. In one embodiment, it is determined that the temperature of the processor is below a threshold and moving the upper operating point and the lower operating point toward one another.

26 Claims, 7 Drawing Sheets

ADAPTIVE THERMAL-BASED FREQUENCY-BOUNDS CONTROL

CROSS-REFERENCE TO RELATED APPLICATIONS

The present application is related to U.S. patent application Ser. No. 10/934,295, filed on Sep. 3, 2004 and U.S. patent application Ser. No. 10/978,362, filed on Nov. 2, 2004.

BACKGROUND

1. Technical Field

One or more embodiments of the present invention generally relate to thermal management. In particular, certain embodiments relate to narrowing the range between operating points chosen by a thermal management controller.

2. Discussion

The popularity of computing systems continues to grow and the demand for more complex processing architectures has reached new heights. As a result, modern workloads and microprocessors can consume more power and generate more heat than previously experienced. In fact, the heat generated may limit the performance and necessitate relatively expensive thermal solutions. Software-based thermal management solutions have been developed to address this concern, but some of these solutions require monitoring of complex variables and can lead to relatively high computational costs. In addition, the reaction time of software-based solutions may be unacceptable for certain emergency situations.

Hardware-based thermal management solutions, on the other hand, react more quickly, while even small amounts of input data are sufficient for suitable performance. For example, certain approaches throttle the processor frequency to a lower frequency when the temperature is relatively high in order to limit power consumption and heat generation. When the temperature declines, the operating frequency may be switched back to the maximum frequency. Thus, such a solution may be able to make throttling decisions based on a relatively limited amount of data, (i.e., whether the temperature is above or below a given threshold).

If the usage model is not too thermally limited (e.g., the optimal throttling frequency is only a few percent less than the maximum frequency) the risk of unused potential may be rather low. For systems that are highly thermally limited, however, such an approach may incur too high a risk of performance loss from alternating between two frequencies that are far from each other. Because microprocessors may be becoming more and more thermally limited, this issue may increase in importance.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art. Furthermore, the use of the terms "first", "second", etc. do not necessarily infer a chronological relationship, and are used to facilitate discussion only.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Figure 1:
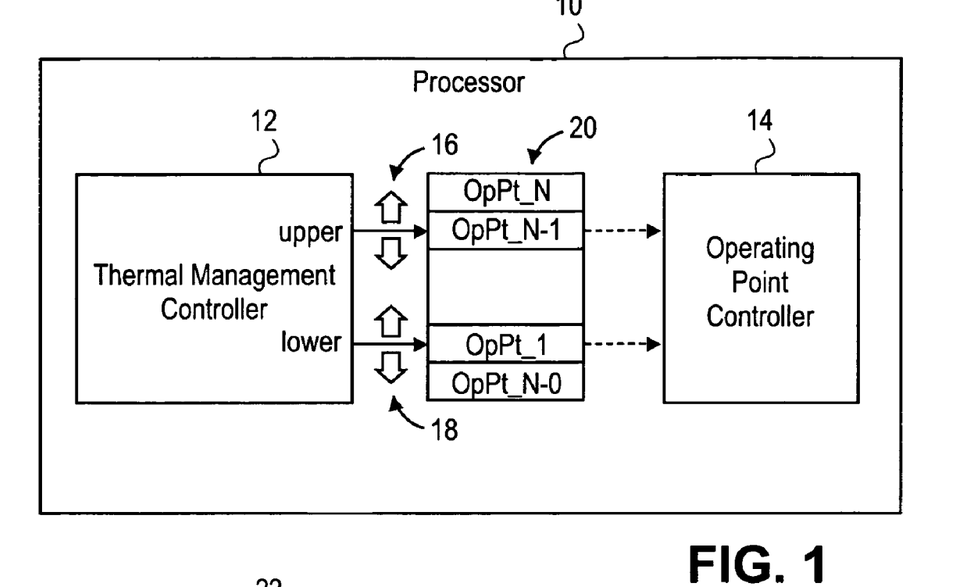
FIG. 1 is block diagram of an example of a processor according to one embodiment of the invention.

FIG. 1 shows a processor 10 having a thermal management controller 12 and an operating point controller 14. The processor 10 may include a reduced instruction set computer (RISC), a pipelined processor, a complex instruction set computer (CISC) and so on. Thus, the illustrated processor 10 is able to execute program code/instructions and can also include instruction fetch units, instruction decoders, execution units, and so on (not shown). Furthermore, the processor 10 may be implemented using hardware techniques such as complementary metal oxide semiconductor (CMOS) technology, controller firmware, microcode, software techniques, and any combination thereof.

In the illustrated example, the processor 10 has an upper operating point 16 and a lower operating point 18, where each operating point 16, 18 may correspond to a bin 20 having an associated frequency and/or voltage setting. Although certain embodiments will be described with regard to the selection of bins containing frequency/voltage pairs, the embodiments of the invention are not so limited. Indeed, the principles described herein can be applied to "bin-less" approaches in which operating points can take on any value, non-frequency/voltage approaches in which other parameters are used as operating points, and any other environment in which temperature, power consumption and/or performance are issues of concern.

The frequency and voltage settings may be maintained in an appropriate voltage-frequency table (not shown) where the operating point controller 14 is able to apply the settings to the processor 10. Thus, as the processor 10 alternates between the low and high points, the lower operating point 18 may be used to "throttle" the processor 10 in order to reduce power consumption and/or temperature and the upper operating point 16 may be used to achieve greater performance when the temperature of the processor 10 is at an acceptable level.

Each of the illustrated operating points 16, 18 can be effectively adjusted up or down by pointing to, selecting, and/or containing different frequency/voltage values depending upon the circumstances. For example, if it is determined that the temperature of the processor 10 is below a temperature threshold, the operating points 16, 18 may be moved toward one another in order to narrow the range between the high and low frequencies, thus converging on a time-dependent, near-optimal frequency. In the case of a finite bin approach, the upper and lower operating points may actually converge on a pair of adjacent frequencies because there may be no single frequency to converge to. Nevertheless, such a "convergence" approach can be extremely advantageous to usage models that are highly thermally limited and therefore can experience deep throttling. This approach also represents a significant departure from conventional approaches, which typically maintain a fixed upper frequency.

Figure 2:
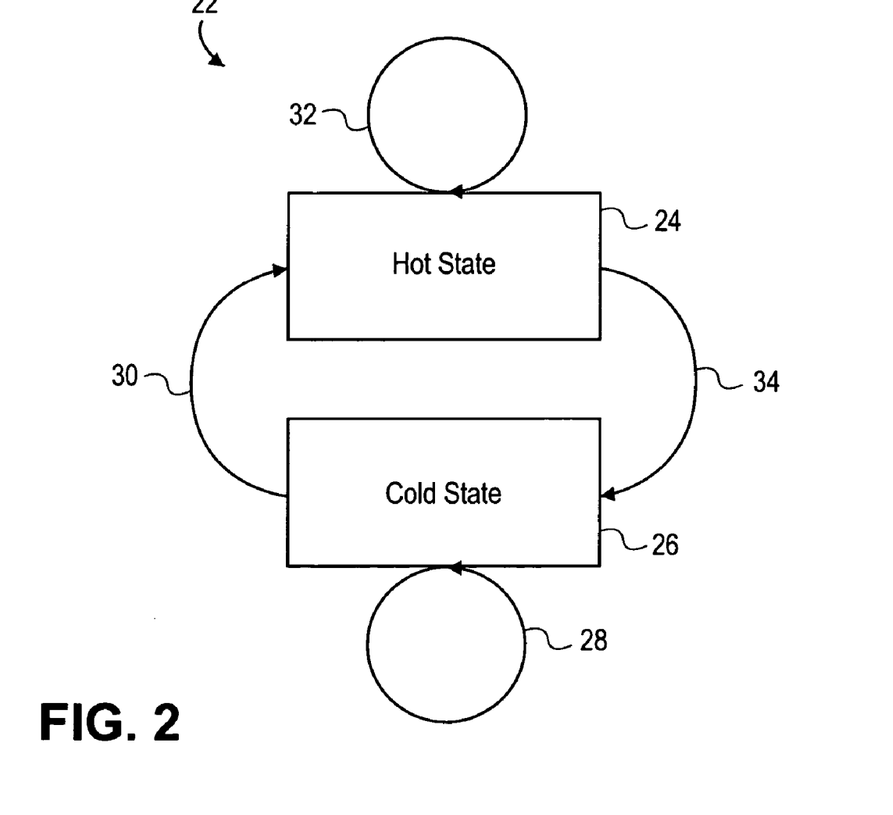
FIG. 2 is a diagram of an example of a state machine according to one embodiment of the invention.

Turning now to FIG. 2, a state machine 22 is shown in which the hot state 24 and cold state 26 of the system can correspond to the temperature of the processor 10 (FIG. 1) being above and below a temperature threshold, respectively. In the illustrated example, four possible invocation schemes can be distinguished, where each invocation scheme can be denoted by the current and previous invocations. In particular, a cold-cold invocation 28 can be initiated by a timer interrupt, which may indicate that the processor has been in the cold state for a sufficient period of time and the upper operating point may be increased without substantial concern over the switching penalty. In the illustrated example, a cold-hot invocation 30 can be initiated by a thermal sensor. Such an invocation could mean that the processor has been cold for some time, but now is hot again. In such a case, a suitable value for the lower operating point may be calculated and the processor can be throttled down to this calculated value.

A hot-cold invocation 34 may take place if the new value for the lower operating point has been successful in reducing the temperature below the temperature threshold after the thermal interrupt. This situation can correspond to a normal system behavior, and may stand for some "stable" state. In this state, the thermal management controller 12 (FIG. 1) may try to move the upper and lower operating points toward one another as already described. Such a technique may leave the average frequency approximately as is, but substantially reduce power consumption because the voltage can be reduced as well. A hot-hot invocation 32 may occur if the new value for the lower operating point is still too high to keep the temperature below the temperature threshold after the thermal interrupt. In such a case, the lower operating point may be further decreased and the process can be repeated until the temperature falls below the threshold.

Figure 3:
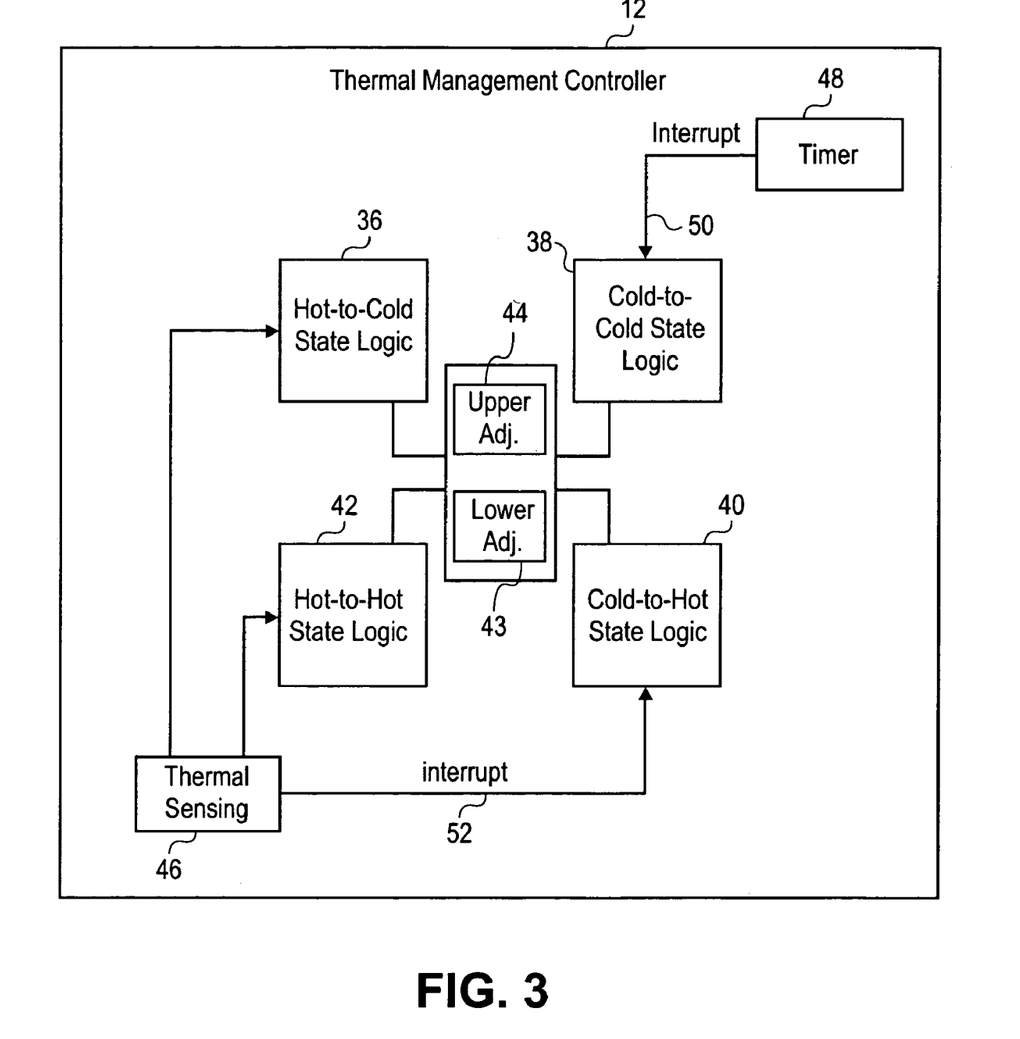
FIG. 3 is a diagram of an example of a thermal management controller according to one embodiment of the invention.

FIG. 3 shows one approach to implementing the thermal management controller 12 in greater detail. In particular, the illustrated thermal management controller 12 includes hot-to-cold state logic 36, cold-to-cold state logic 38, cold-to-hot state logic 40 and hot-to-hot state logic 42. The illustrated thermal management controller 12 also includes an upper point adjustment module 44, a lower point adjustment module 43, a thermal sensing module 46 and a timer 48. The timer 48 may be time-based or in more elaborate solutions based on event/performance monitor statistics. In addition, the thermal sensing module 46 may be either thermal-based or event/performance monitor based. The cold-to-cold state logic 38 can detect a timer interrupt 50, which may indicate that the processor has been cold for a certain amount of time (e.g., 20 msec), save the upper and lower operating points, and use the upper adjustment module 44 to increase the upper operating point. The cold-to-hot state logic 40 may detect a thermal interrupt 52 from the thermal sensing module 46 and increase the lower operating point based on the last successful operating point. This technique can be used to locate the maximum possible operating point still capable of maintaining the system within the given thermal constraints.

The hot-to-hot state logic 42 can be invoked when it is determined that the temperature is not below the temperature threshold. This determination can be made once a hysteresis-based period of time (e.g., 1 msec) has expired after applying the lower operating point to the processor. In one embodiment, the hot-to-hot state logic 42 updates the last unsuccessful operating point based on the current lower operating point and further decreases the lower operating point. The illustrated hot-to-cold state logic 36 can be invoked when the temperature of the processor falls below the temperature threshold, and may provide for confirming the stability of the thermal state of the processor and moving the upper operating point and the lower operating point toward one another if the processor is stable. The processor stability can be confirmed by tracking the number of times the processor has been successfully throttled using the current upper and lower operating points. If this number exceeds a particular threshold (e.g., two throttlings), the processor can be deemed as being stable enough to attempt to narrow the range between the upper and lower operating points. In one approach, the operating points are moved toward one another by calculating the average between two points, increasing the lower operating point toward the average (i.e., selecting a greater value) and decreasing the upper operating point toward the average (i.e., selecting a lesser value). It should also be noted that to avoid truncation errors, a constraint can be imposed to prevent the lower operating point from exceeding the upper operating point.

Figure 4:
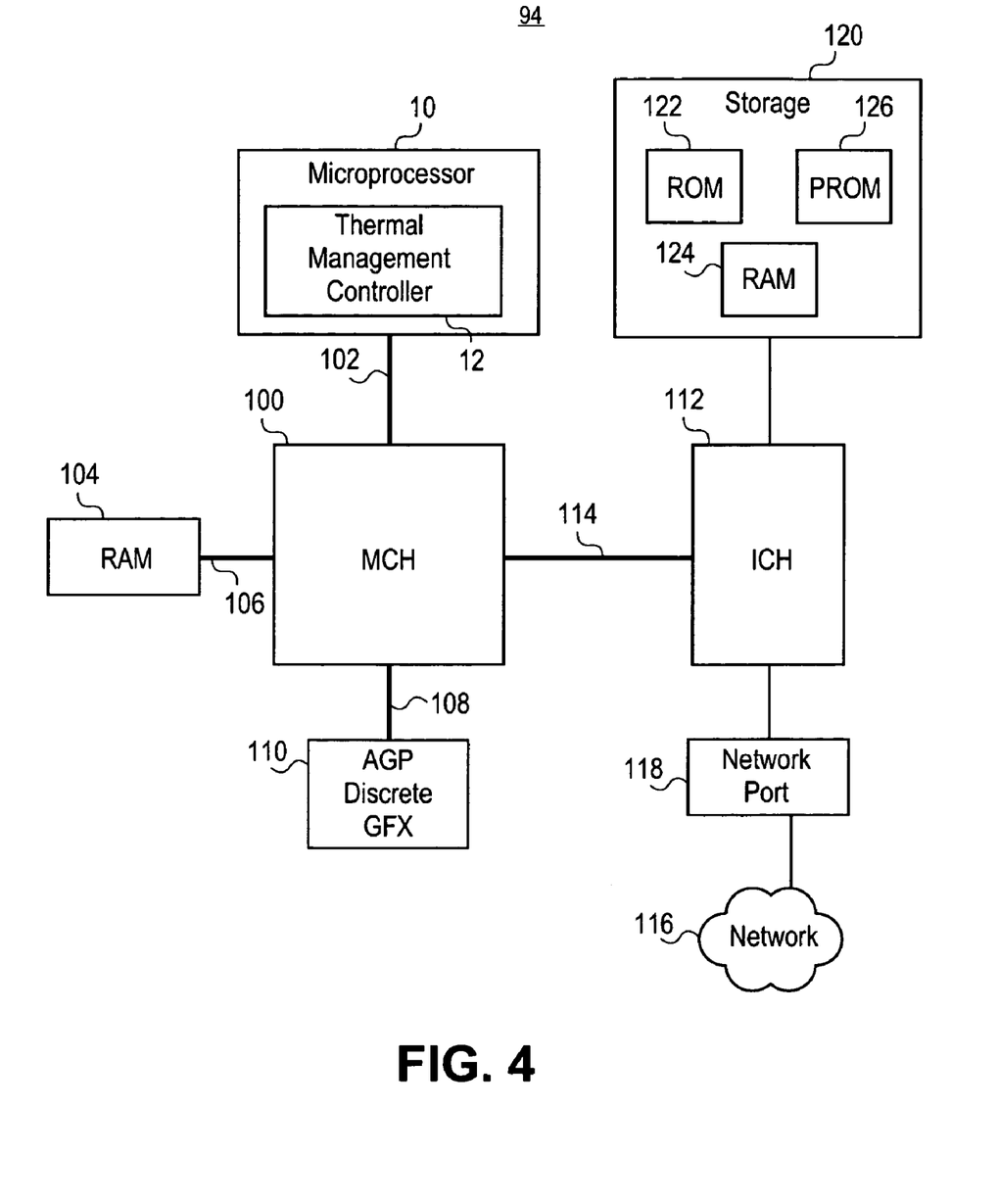
FIG. 4 is a diagram of an example of a system according to one embodiment of the invention.
Figure 8:
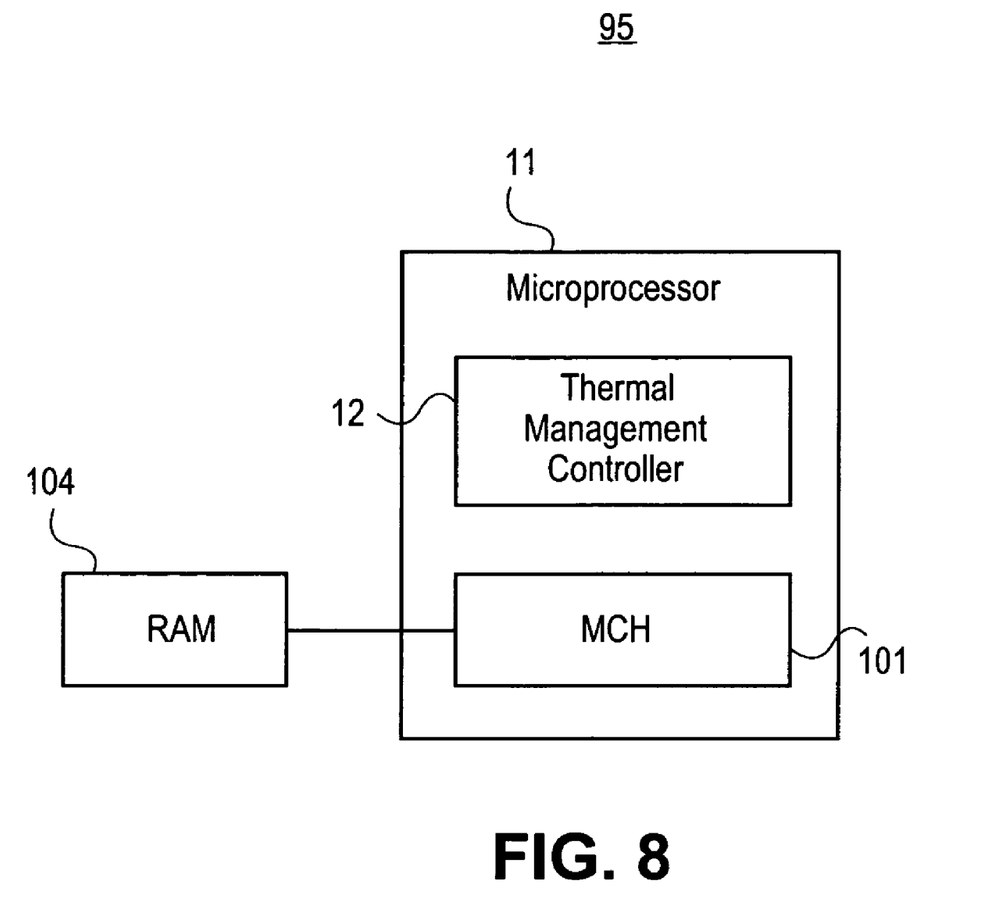
FIG. 8 is a diagram of an example of a system according to an alternative embodiment of the invention.

Turning now to FIG. 4, a system 94 having the processor 10 and thermal management controller 12 is shown. The illustrated processor 10 communicates with a memory controller hub (MCH) 100, also known as a Northbridge, via a bus 102 such as a front side bus or a point-to-point fabric that interconnects all of the components in the system 94. The MCH 100 can communicate with system random access memory (RAM) 104 via a memory bus 106, where the RAM 104 may include high-speed static RAM (SRAM), slower dynamic RAM (DRAM), etc. The DRAM modules may also be incorporated in to a single inline memory module (SIMM), dual inline memory module (DIMM), small outline DIMM (SODIMM), and so on. The MCH 100 may also communicate via a graphics bus 108 with an advanced graphics port (AGP) 110 to interface with an external video display unit (not shown). The illustrated MCH 100 communicates with an I/O controller hub (ICH) 112, also known as a Southbridge, via a peripheral component interconnect (PCI) bus 114. The processor 10 may also be operatively connected to a network 116 via a network port 118 through the ICH 112. The ICH may also be coupled to storage 120, which may include a read only memory (ROM) 122, RAM 124, programmable ROM (PROM) 126, flash memory, etc. FIG. 8 shows an alternative system 95 in which a memory controller 101 is included on the same die as a processor 11 and the thermal management controller 12.

Figure 5:
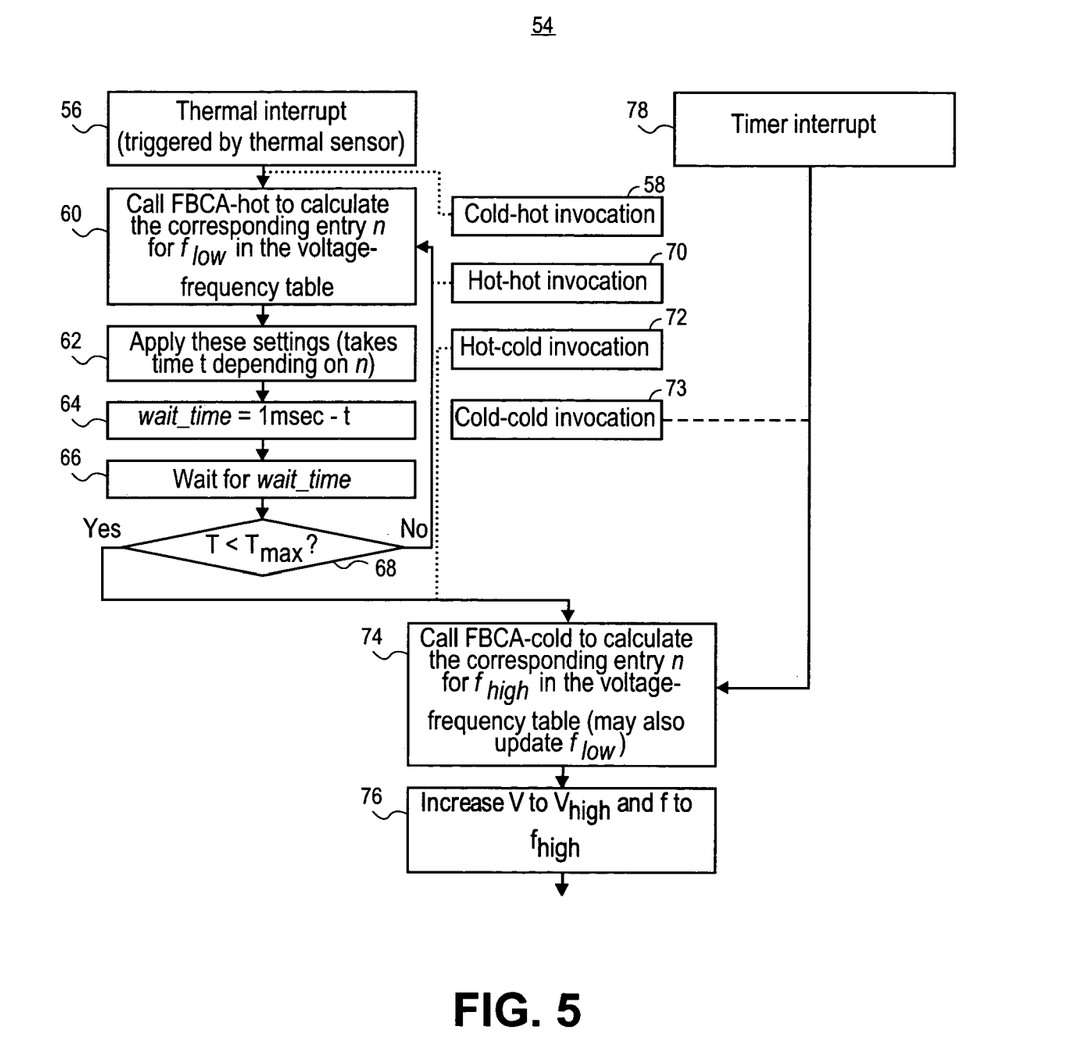
FIG. 5 is a flowchart of an example of a method of thermal management according to one embodiment of the invention.

FIG. 5 shows a method 54 of thermal management for a system, processor or other device having an upper operating point and a lower operating point. The illustrated method 54 is a single "synchronous" sequence for a cold-state system. Thus, when the system is in the cold state, either a thermal interrupt or timer interrupt may trigger the sequence shown. Eventually, the system can return to the cold state, and the process may repeat. The illustrated method 54 may be implemented, for example, using hardware, microcode or any machine-readable medium or article which may store an instruction or a set of instructions that, if executed by a machine (for example, by a multi-processing unit and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

The algorithm for computing frequencies and/or selecting bins can be viewed as a frequency-bounds control algorithm (FBCA), and the associated control mechanism, which may include the unit for FBCA, timers and thermal sensor as a frequency-bounds control mechanism (FBCM). The branch of the algorithm handled by the cold-cold invocation 28 (FIG. 2) and the hot-cold invocation 34 (FIG. 2), may be referred to as "FBCA-cold", and the branch of the algorithm handled by the cold-hot invocation 30 (FIG. 2) and the hot-hot invocation 32 (FIG. 2) may be referred to as "FBCA-hot".

In the illustrated example, a thermal interrupt is detected at processing block 56, where the thermal interrupt may be triggered by a thermal sensor/module. If such an interrupt is detected in the cold state, the processor has transitioned from the cold state to the hot state and may need to be throttled. The cold-hot invocation therefore takes place at block 58 in response to the thermal interrupt, where the FBCA-hot branch is called at block 60. Generally, the FBCA-hot branch can calculate the corresponding entry/bin (e.g., "n") for the lower frequency (e.g., "$f_{low}$") and the lower voltage (e.g., "$V_{low}$") in the voltage-frequency table. The calculated lower operating point is applied to the processor at block 62, where the process takes an amount of time (e.g., "t"), depending on the lower operating point, to complete. Block 64 provides for defining a wait period as wait_time=1 msec–t, and block 66 provides for waiting the defined period of time. It is determined at block 68 whether the temperature of the processor has fallen below the temperature threshold (e.g., "$T_{max}$"), where if the answer is "No" the hot-hot invocation at block 70. In this case, the FBCA-hot branch is called again and the lower operating point is recalculated.

If the temperature has fallen below the threshold, the hot-cold invocation takes place at block 72. Block 74 therefore provides for calling the FBCA-cold branch, which calculates the corresponding entry n for the upper frequency (e.g., "$f_{high}$"). The lower frequency may also be calculated during this process. The voltage of the processor (e.g., "V") can be increased to the upper votage (e.g., "$V_{high}$") and the frequency can be increased to the upper frequency at block 76. If a timer interrupt is detected in the cold state at block 78, the FBCA-cold branch can be called again to effect a cold-cold invocation 73, where the upper operating point is recalculated.

Figure 6:
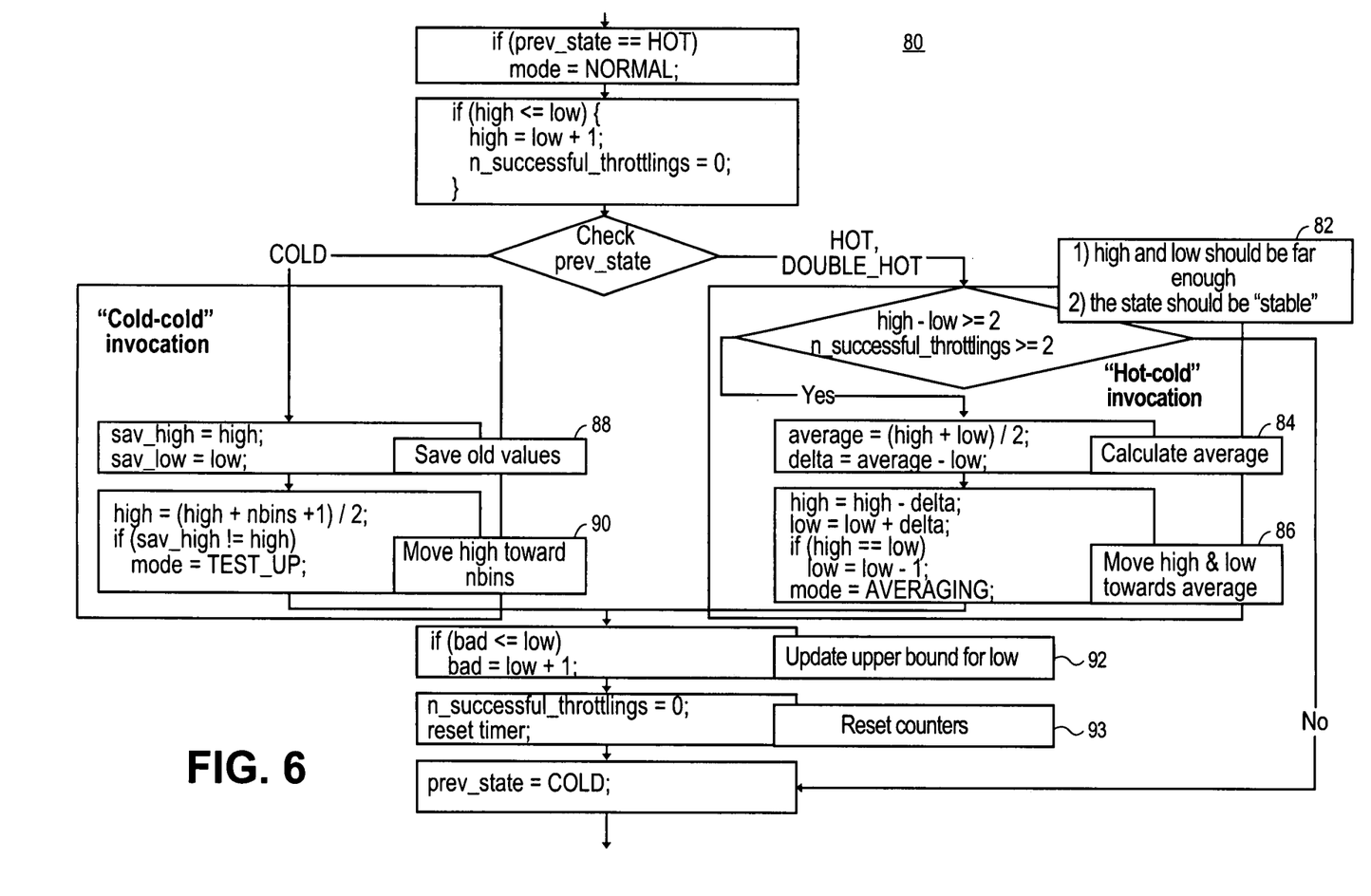
FIG. 6 is a flowchart of an example of a process of cold state control according to one embodiment of the invention.

Turning now to FIG. 6, one approach to the FBCA-cold branch is shown in greater detail at 80. In general, the illustrated "low" and "high" variables correspond to the latest probed bins for $f_{low}$ and $f_{high}$, (and the corresponding voltages $V_{low}$ and $V_{high}$) respectively. The "prev_state" variable reflects the situation leading to the previous call to FBCA and can take on one of three values: COLD, meaning the previous call was initiated due to the temperature falling below the temperature threshold; HOT, meaning the previous call was initiated due to the temperature being at or above the threshold a first time; and DOUBLE_HOT, meaning there has been a series of at least two calls with the temperature above the threshold. The "bad" variable can denote the last unsuccessful probed bin for $f_{low}$ (after convergence, bad should be one bin above the bin corresponding to $f_{low}$). The illustrated "mode" variable reflects the state of the last operation on the high or low bins and may take on one of three values: NORMAL, meaning that the last operation has been confirmed; AVERAGING, meaning that the last operation moved high and low towards one another; and TEST_UP, meaning that the high bin has been artificially increased. The "n_successful_throttlings" variable measures how many times the system has been alternated between the hot and cold states since the last changes of high or low. The "sav_low" and "sav_high" variables are used to save the values of low and high in the cold-cold invocation.

Thus, it can be seen that in the hot-cold invocation, block 82 provides for confirming that the upper operating point and the lower operating point are far enough away from each other and confirming the stability of the thermal state of the processor. As already discussed, the stability can be confirmed by tracking the number of times the processor has been successfully throttled using the current upper and lower operating points. The (truncated) average between the upper operating point and the lower operating point is calculated at block 84 and block 86 provides for increasing the lower operating point toward the average and decreasing the upper operating point toward the average. In the illustrated example, low is kept strictly below high. By moving the two operating points toward one another, block 86 provides for reducing the number of and penalty for transitions between the upper and lower operating points. Such an approach can also enhance the user's experience because processor performance is more predictable—particularly in thermally limited environments.

In the cold-cold invocation, block 88 provides for saving the upper operating point and the lower operating point and block 90 provides for increasing the upper operating point by moving half-way toward nbins, where nbins is the maximum number of bins 20 (FIG. 1, "OpPt_N"). Thus, the operation (high+nbins+1)/2 will not produce a result greater than N. In this regard, it should be noted that the division operations described herein can be integer operations (i.e., the result can be truncated). Once again, the ability to move the upper operating point enables substantial advantages over conventional approaches because the upper operating point can be tailored to the varying operating conditions of the system. In this case, the upper operating point can be increased because the processor is known to be in the cold state for a significant period of time. Block 92 provides for updating the upper bound for the lower operating point (i.e., the bad variable) and block 93 provides for resetting the counters.

Figure 7:
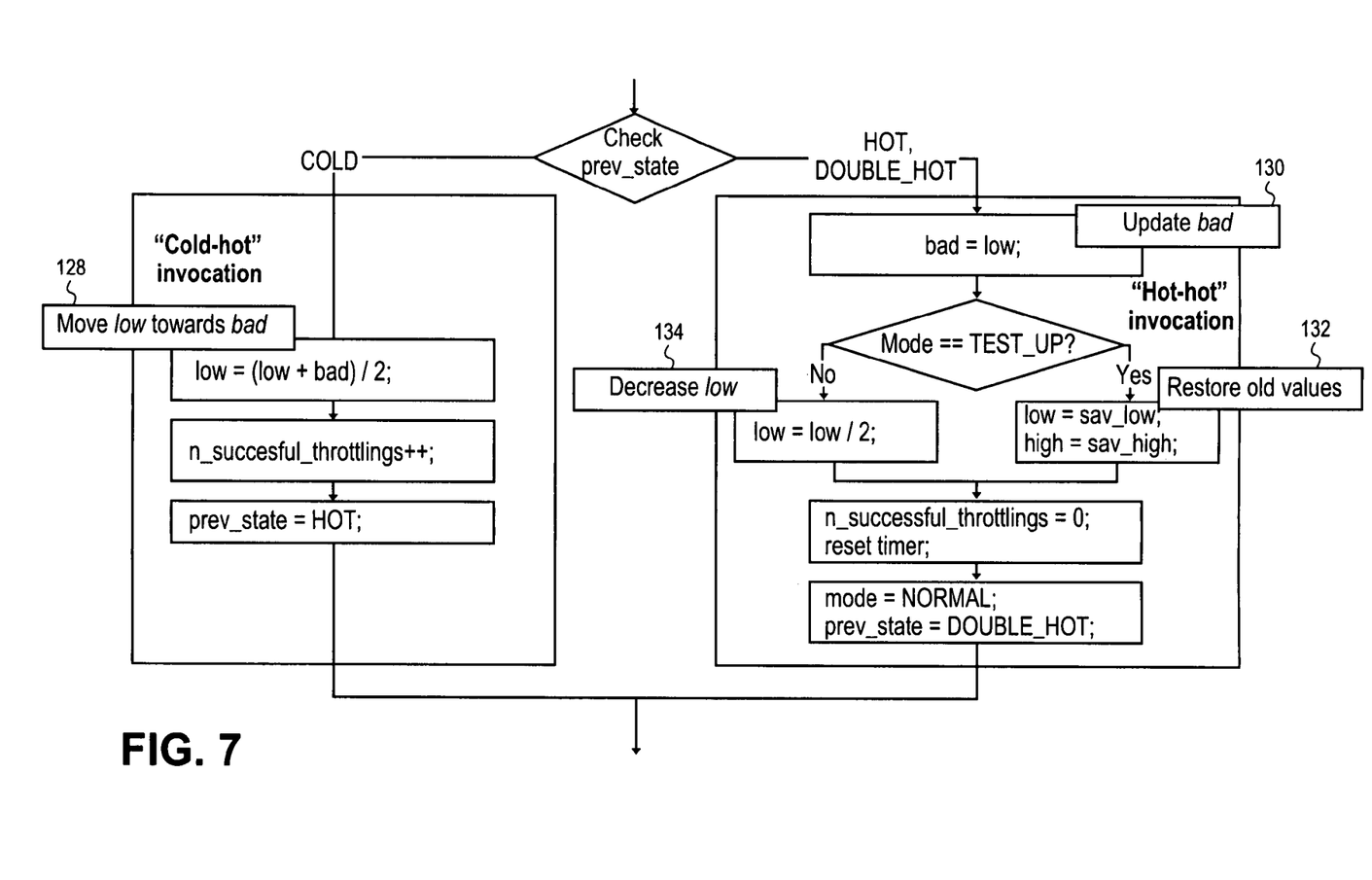
FIG. 7 is a flowchart of an example of a process of hot state control according to one embodiment of the invention.

FIG. 7 shows one approach to the FBCA-hot branch in greater detail. In particular, the illustrated cold-hot invocation provides for increasing the lower operating point based on the last unsuccessful operating point at block 128. In particular, low can be moved half-way toward bad. The hot-hot invocation provides for updating the last unsuccessful operating point at block 130. If it is determined that the previous action was the artificial increasing of the upper bound in the cold-cold mode (i.e., Mode==TEST_UP), then the conclusion is that the settings are incorrect and the old settings are restored at block 132. Otherwise, block 134 provides for decreasing the lower operating point.

Thus, by dynamically adapting both upper and lower operating points, the techniques described herein enable better performance for hot applications than currently obtained from existing throttling techniques using similar input data. The above approaches can also be more efficient than conventional approaches because operating points such as voltage and frequency can be set at an intermediate level in order to avoid the penalties associated with throttling.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
   determining that a temperature of a processor is below a threshold, the processor having an upper operating point and a lower operating point; and
   moving the upper operating point and the lower operating point toward one another in response to the determining;
   confirming a stability of a thermal state of the processor
   calculating an average between the upper operating point and the lower operating point;
   selecting a greater value for the lower operating point based on the average;
   selecting a lesser value for the upper operating point based on the average; and
   applying the upper operating point to the processor.

2. The method of claim 1, wherein the confirming includes tracking a number of times the processor has been successfully throttled using the upper operating point and the lower operating point.

3. The method of claim 1, further including:
   detecting a timer interrupt;
   saving the upper operating point and the lower operating point;
   selecting a greater value for the upper operating point to obtain an increased upper operating point; and
   applying the increased upper operating point to the processor.

4. The method of claim 3, further including:
   detecting a thermal interrupt;
   selecting a greater value for the lower operating point based on a last unsuccessful operating point to obtain a first lower operating point;
   applying the first lower operating point to the processor; and
   waiting a period of time in response to the first lower operating point being applied to the processor.

5. The method of claim 4, further including:
   determining that the temperature is not below the threshold after the period of time has expired;
   updating the last unsuccessful operating point based on the first lower operating point;
   selecting a lesser value for the first lower operating point to obtain a second lower operating point;
   applying the second lower operating point to the processor; and
   waiting the period of time in response to the second lower operating point being applied to the processor.

6. The method of claim 1, wherein moving each operating point includes selecting a bin having an associated frequency and voltage setting.

7. An apparatus comprising:
   a processor having an upper operating point and a lower operating point:
   a thermal management controller to move the upper operating point and the lower operating point toward one another in response to determining that a temperature of the processor is below a threshold, the thermal management controller including hot-to-cold state logic to confirm a stability of a thermal state of the processor and to move the upper operating point and the lower operating point by calculating an average between the upper operating point and the lower operating point by selecting a greater value for the lower operating point based on the average and selecting a lesser value for the upper operating point based on the average.

8. The apparatus of claim 7, further including an operating point controller to apply the upper operating point to the processor.

9. The apparatus of claim 7, wherein the hot-to-cold state logic is to confirm the stability by tracking a number of times the processor has been successfully throttled using the upper operating point and the lower operating point.

10. The apparatus of claim 9, wherein the thermal management controller includes cold-to-hot state logic to detect a thermal interrupt and select a greater value for the lower operating point based on a last successful operating point to obtain a first lower operating point, the operating point controller to apply the first lower operating point to the processor, the thermal management controller to wait a period of time in response to the first lower operating point being applied to the processor.

11. The apparatus of claim 10, wherein the thermal management controller is to determine that the temperature is not below the threshold after the period of time has expired, the thermal management controller having hot-to-hot logic update the last unsuccessful operating point based on the first lower operating point and select a lesser value for the first lower operating point to obtain a second lower operating point, the operating point controller to apply the second lower operating point to the processor, the thermal management controller to wait the period of time in response to the second lower operating point being applied to the processor.

12. The apparatus of claim 7, wherein the thermal management controller includes cold-to-cold state logic to detect a timer interrupt, save the upper operating point and the lower operating point, and select a greater value for the upper operating point to obtain an increased operating point, the operating point controller to apply the increased upper operating point to the processor.

13. The apparatus of claim 7, wherein the thermal management controller is to move each operating point by selecting a bin having an associated frequency and voltage setting.

14. A system comprising:
a memory;
a processor coupled to the memory, having:
   a memory controller hub coupled to the memory,
   an upper operating point, a lower operating point, and
   a thermal management controller to move the upper operating point and the lower operating point toward one another in response to determining that a temperature of the processor is below a threshold, the thermal management controller including hot-to-cold state logic to confirm a stability of a thermal state of the processor and to move the upper operating point and the lower operating point by calculating an average between the upper operating point and the lower operating point by selecting a greater value for the lower operating point based on the average and selecting a lesser value for the upper operating point based on the average.

15. The system of claim 14, wherein the processor further includes an operating point controller to apply the upper operating point to the processor.

16. The system of claim 15, wherein the hot-to-cold state logic is to confirm the stability by tracking a number of times the processor has been successfully throttled using the upper operating point and the lower operating point.

17. The system of claim 15, wherein the thermal management controller includes cold-to-cold state logic to detect a timer interrupt, save the upper operating point and the lower operating point, and select a greater value for the upper operating point to obtain an increased operating point, the operating point controller to apply the increased upper operating point to the processor.

18. The system of claim 17, wherein the thermal management controller includes cold-to-hot state logic to detect a thermal interrupt and select a greater value for the lower operating point based on a last successful operating point to obtain a first lower operating point, the operating point controller to apply the first lower operating point to the processor, the thermal management controller to wait a period of time in response to the first lower operating point being applied to the processor.

19. The system of claim 18, wherein the thermal management controller is to determine that the temperature is not below the threshold after the period of time has expired, the thermal management controller having hot-to-hot logic update the last unsuccessful operating point based on the first lower operating point and select a lesser value for the first lower operating point to obtain a second lower operating point, the operating point controller to apply the second lower operating point to the processor, the thermal management controller to wait the period of time in response to the second lower operating point being applied to the processor.

20. A machine readable medium comprising a stored set of instructions which, if executed by a machine, cause the machine to perform a method including:
   determining that a temperature of a processor is below a threshold, the processor having an upper operating point and a lower operating point; and moving the upper operating point and the lower operating point toward one another in response to the determining
   confirming a stability of a thermal state of the processor
   calculating an average between the upper operating point and the lower operating point;
   selecting a greater value for the lower operating point based on the average;
   selecting a lesser value for the upper operating point based on the average; and
   applying the upper operating point to the processor.

21. The medium of claim 20, wherein if executed, the instructions further result in:
   detecting a timer interrupt;
   saving the upper operating point and the lower operating point;
   increasing the upper operating point to obtain an increased upper operating point; and
   applying the increased upper operating point to the processor.

22. The medium of claim 21, wherein if executed, the instructions further result in:
   detecting a thermal interrupt;
   increasing the lower operating point based on a last unsuccessful operating point to obtain a first lower operating point;
   applying the first lower operating point to the processor; and
   waiting a period of time in response to the first lower operating point being applied to the processor.

23. The medium of claim 22, wherein if executed, the instructions further result in:
   determining that the temperature is not below the threshold after the period of time has expired;
   updating the last unsuccessful operating point based on the first lower operating point;
   decreasing the first lower operating point to obtain a second lower operating point;
   applying the second lower operating point to the processor; and
   waiting the period of time in response to the second lower operating point being applied to the processor.

24. A method comprising:
   determining that a temperature of a processor is below a threshold, the processor having an upper frequency setting and a lower frequency setting;
   confirming a stability of a thermal state of the processor;
   calculating an average between the upper frequency setting and the lower frequency setting;
   selecting a greater value for the lower frequency setting based on the average;
   selecting a lesser value for the upper frequency setting based on the average;
   applying the upper frequency setting to the processor;
   detecting a timer interrupt; saving the upper frequency setting and the lower frequency setting;
   selecting a greater value for the upper frequency setting to obtain an increased upper frequency setting; and
   applying the increased upper frequency seining to the processor.

25. The method of claim 24, wherein the confirming includes tracking a number of times the processor has been successfully throttled using the upper frequency setting and the lower frequency setting.

26. The method of claim 24, wherein each frequency setting has a corresponding voltage setting.

* * * * *

UNITED STATES PATENT AND TRADEMARK OFFICE
CERTIFICATE OF CORRECTION

| | | |
|---|---|---|
| PATENT NO. | : 7,463,993 B2 | Page 1 of 1 |
| APPLICATION NO. | : 11/125769 | |
| DATED | : December 9, 2008 | |
| INVENTOR(S) | : Finkelstein et al. | |

It is certified that error appears in the above-identified patent and that said Letters Patent is hereby corrected as shown below:

In column 10, at line 58 delete, "seining" and insert --setting--.

Signed and Sealed this

Twenty-ninth Day of December, 2009

David J. Kappos
*Director of the United States Patent and Trademark Office*